(12) United States Patent
McClure et al.

(10) Patent No.: US 7,296,393 B1
(45) Date of Patent: Nov. 20, 2007

(54) STUFFER CENTER CRANK BEARING

(75) Inventors: John R. McClure, New Holland, PA (US); William Dale Hotaling, New Holland, PA (US)

(73) Assignee: CNH America LLC, New Holland, PA (US)

( * ) Notice: Subject to any disclaimer, the term of this patent is extended or adjusted under 35 U.S.C. 154(b) by 0 days.

(21) Appl. No.: 11/468,825

(22) Filed: Aug. 31, 2006

(51) Int. Cl.
*A01D 39/00* (2006.01)
*A01D 43/02* (2006.01)
*A01D 75/00* (2006.01)

(52) U.S. Cl. .................................................. 56/341

(58) Field of Classification Search ................. 56/341, 56/14.6, 12.4; 460/85, 110, 16; 100/189, 100/142; 198/722
See application file for complete search history.

(56) References Cited

U.S. PATENT DOCUMENTS

| 485,045 | A | | 10/1892 | Kruse et al. |
|---|---|---|---|---|
| 790,082 | A | | 5/1905 | Shaw |
| 2,409,478 | A | | 10/1946 | Diokow |
| 2,701,634 | A | * | 2/1955 | Carroll ..................... 198/518 |
| 2,765,902 | A | | 10/1956 | Myers |
| 3,351,002 | A | | 11/1967 | McDuffie |
| 3,439,683 | A | * | 4/1969 | Keller ........................ 460/13 |
| 3,511,362 | A | | 5/1970 | Gaeddert et al. |
| 3,938,652 | A | | 2/1976 | Sacht et al. |
| 4,106,268 | A | * | 8/1978 | White et al. .................... 56/1 |
| 4,656,938 | A | | 4/1987 | Webb et al. |
| 5,044,272 | A | | 9/1991 | Jennings |
| 5,595,055 | A | | 1/1997 | Horchler et al. |
| 6,327,840 | B1 | | 12/2001 | Rumph |
| 6,640,527 | B2 | * | 11/2003 | Farley et al. ................ 56/12.4 |
| 6,651,418 | B1 | | 11/2003 | McClure et al. |
| 2002/0066264 | A1 | | 6/2002 | Bergkamp et al. |

* cited by examiner

*Primary Examiner*—Árpád Fábián Kovács
(74) *Attorney, Agent, or Firm*—Patrick M. Sheldrake; John William Stader; Michael G. Harms

(57) ABSTRACT

An improved stuffer mechanism for a baler having an array of feeder fingers uniformly spaced across a stuffer feeder table and a centrally located support bearing for the stuffer feeder finger crankshaft that does not disrupt the uniform feeder finger spacing.

18 Claims, 4 Drawing Sheets

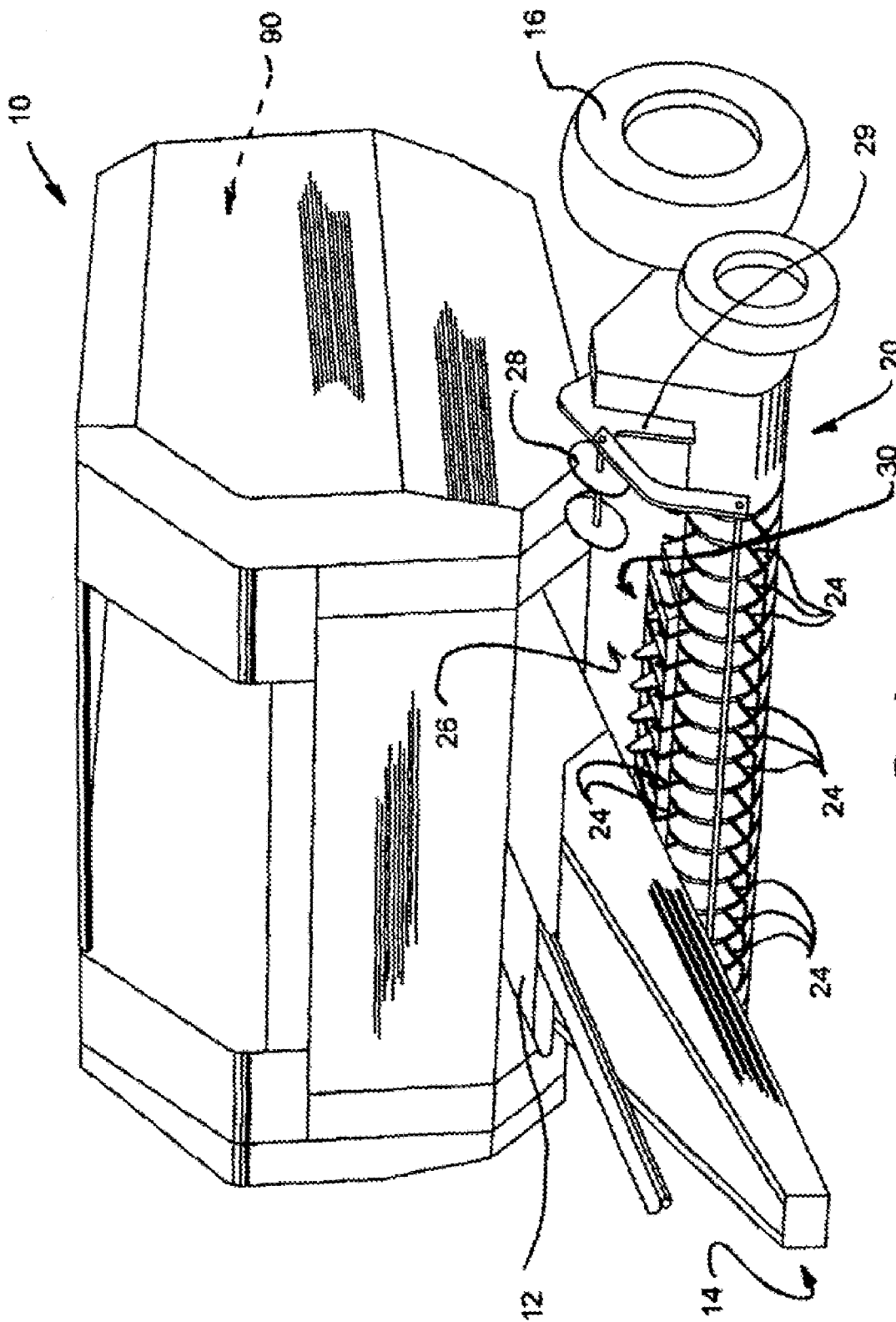

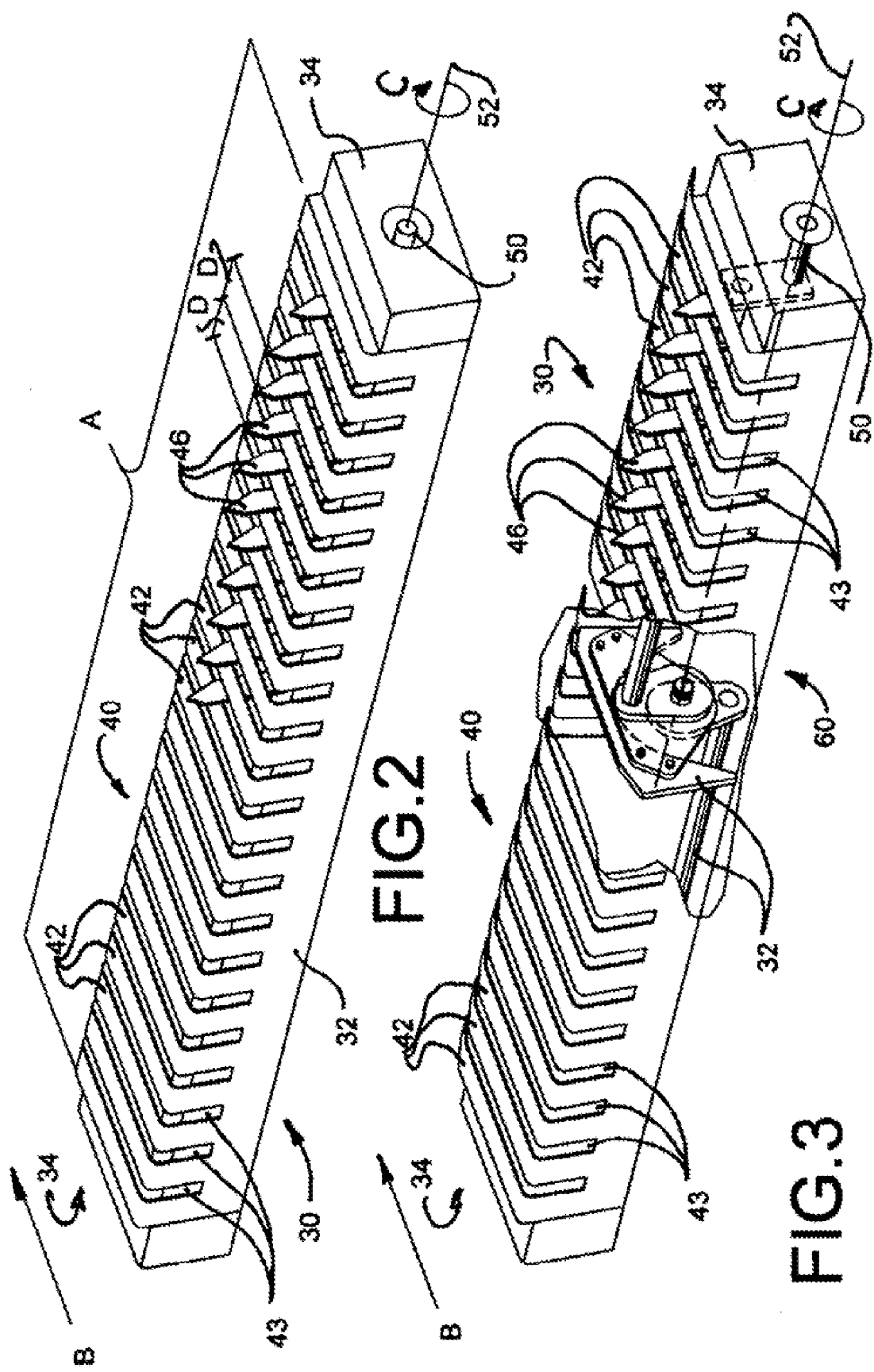

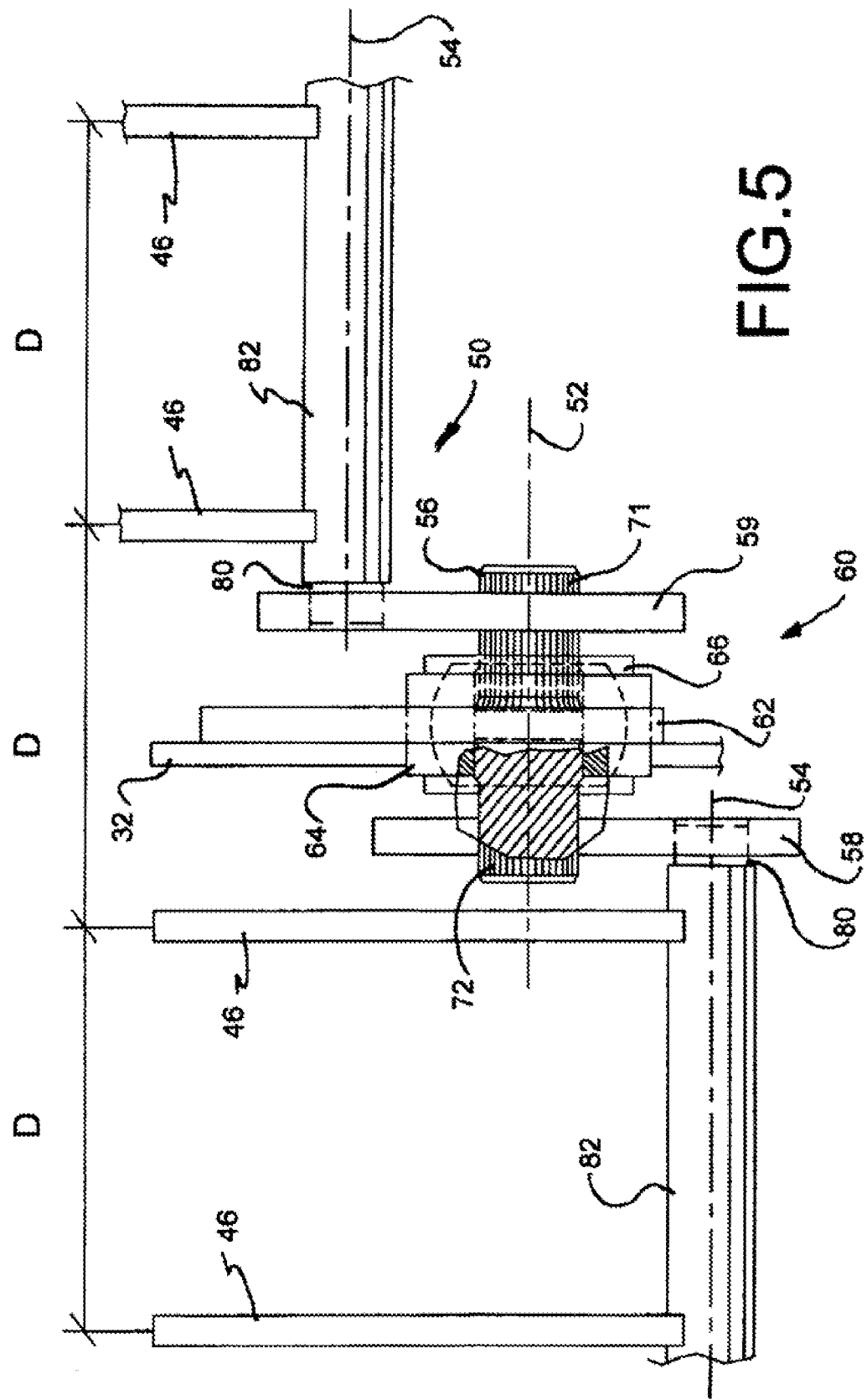

STUFFER CENTER CRANK BEARING

BACKGROUND OF THE INVENTION

The present invention relates generally to a baler for forming cylindrical bales of crop material, commonly referred to as a round baler, and more particularly to an improvement to round baler pickups having an intermediate stuffer mechanism.

For many years agricultural balers have been used to consolidate and package crop material so as to facilitate the storage and handling of the crop material for later use. Usually, a mower-conditioner cuts and conditions the crop material for windrow drying in the sun. When the cut crop material is properly dried, a baler is pulled along the windrows to pick up the crop material and form it into conveniently sized and shaped round bales. More specifically, the pickup of the baler gathers the cut and windrowed crop material and lifts it into the bale-forming chamber. In a typical round baler, the bale-forming chamber consists of a pair of opposing sidewalls with a series of belts that rotate and compress the crop material into a cylindrical shape. When the bale has achieved a desired size and density, the operator wraps the bale to ensure that the bale maintains its shape and density. The formed bale may be wrapped in its compact form by net, twine, or the like. The operator then raises the tailgate of the baler and ejects the bale onto the ground for subsequent handling. The tailgate is then closed and the cycle repeated as necessary and desired to manage the field of cut crop material. Utilization of rolls in combination with belts is shown by way of example in the round baler of U.S. Pat. No. 5,044,272, "Round Baler with Rollers and Belts" by Jennings.

During field operation, a pickup assembly picks up crop material, such as hay, from the ground and feeds it into a fixed or adjustable bale-forming chamber where it is rolled up to form a compact cylindrical package of hay.

Round balers commonly rely on a pickup with a set of tines that engage a windrow of crop material on the ground and lift it upwardly and then urge it rearwardly along a continuous path from the ground to a transverse opening to a bale-forming chamber. The path between the pickup tines and the opening to the bale-forming chamber is represented by a generally planar feed table. In certain configurations, the pickup tines disengage from the crop material before the material reaches the bale-forming chamber thereby creating the need for additional feed assist means, commonly referred to as a stuffer. The stuffer is a mechanism for conveying cut crop material from the pickup tines to the baling chamber. More specifically, the stuffer has a transverse array of stuffer fingers mounted on a drive assembly, typically a rotating crankshaft, so that each stuffer finger is moved along an elliptical path in a forward-rearward plane. When the cut crop material reaches the feed table and engages the array of moving stuffer fingers, the array feeds the cut crop material rearward into the bale-forming chamber through the inlet opening. Having entered the bale-forming chamber through the inlet opening the cut crop is formed into a bale by one of the several conventionally known methods.

Modern farming practices require balers to operate efficiently with a range of cut crop material. Balers must be capable of engaging a common windrow of crop, lifting the crop in the windrow from the ground and transporting it to the bale-forming chamber. In order to effectively engage a common windrow, the pickup apparatus must be of sufficient width, i.e., the pickup is usually wider than the bale-forming chamber to increase the amount of cut crop that can be harvested per unit of time. Consolidating devices compress the incoming crop to near the width of the bale-forming chamber as it moves onto the feed table. Moving side-by-side fingers must be uniformly located along the width of the feed table to uniformly move crop material from the feed table into the bale-forming chamber and allow the baler to form bales having consistent crop compaction throughout. The result is that typical stuffer mechanisms have evolved in a manner that requires the stuffer crankshaft to span the entire width of the baling chamber, generally on the order of five feet, without any intermediate (mid-span) support of the internal mechanism.

Crop density in the windrow may also vary from low-density straw of hay to higher density silage grasses. The need to accommodate higher density crop materials places additional loads on the stuffer mechanism. These additional loads further contribute to stuffer crankshaft deflection that can lead to premature bearing and bushing wear and even failure of the stuffer crankshaft. Providing a mid-span support for the stuffer crankshaft using previously known techniques requires that stuffer fingers proximate to the support be eliminated thereby adversely affecting crop feed uniformity from the feed table to the bale-forming chamber.

It would be a great advantage to provide a stuffer mechanism incorporating a central support for the crankshaft that allows stuffer fingers to be substantially uniformly distributed across the entire width of the stuffer mechanism. These and other advantages are provided by the stuffer mechanism described below.

SUMMARY OF THE INVENTION

Accordingly, it is an object of the present invention to provide a central stuffer crankshaft support that does not interfere with the stuffer feeder structure of the stuffer mechanism in a baler.

It is a further object of the present invention to provide a stuffer mechanism for a round baler that uniformly moves a mat of crop material from a pickup apparatus to a bale-forming chamber.

It is a further object of the present invention to provide a stuffer mechanism for a round baler that includes an array of uniformly narrowly spaced, moving feeder fingers to move crop material across the stuffer mechanism.

It is a still further object of the present invention to provide an additional centrally-located crankshaft support having a width less than the gap between adjacent feeder fingers in a stuffer mechanism for a round baler that includes an array of uniformly narrowly spaced, moving feeder fingers to move crop material across the stuffer mechanism.

It is a still further object of the present invention to provide an improved stuffer mechanism that is durable in construction, inexpensive of manufacture, carefree of maintenance, easily assembled, and simple and effective to use.

These and other objects are achieved by providing an improved stuffer mechanism for a baler having an array of feeder fingers uniformly spaced across a stuffer feeder table and a centrally located support bearing for the stuffer feeder finger crankshaft that does not disrupt the uniform feeder finger spacing.

BRIEF DESCRIPTION OF THE DRAWINGS

The advantages of this invention will be apparent upon consideration of the following detailed disclosure of the invention, especially when taken in conjunction with the accompanying drawings wherein:

FIG. 1 is an agricultural harvester in accordance with a preferred embodiment of the present invention;

FIG. 2 is a detail view of a stuffer assembly of the type in which the present invention is useful;

FIG. 3 is a cutaway view of the stuffer assembly as shown in FIG. 2 showing the present invention;

FIG. 5 is a detailed assembly view of the present invention showing the stuffer crankshaft support structure.

DESCRIPTION OF THE PREFERRED EMBODIMENT(S)

Figure 4:
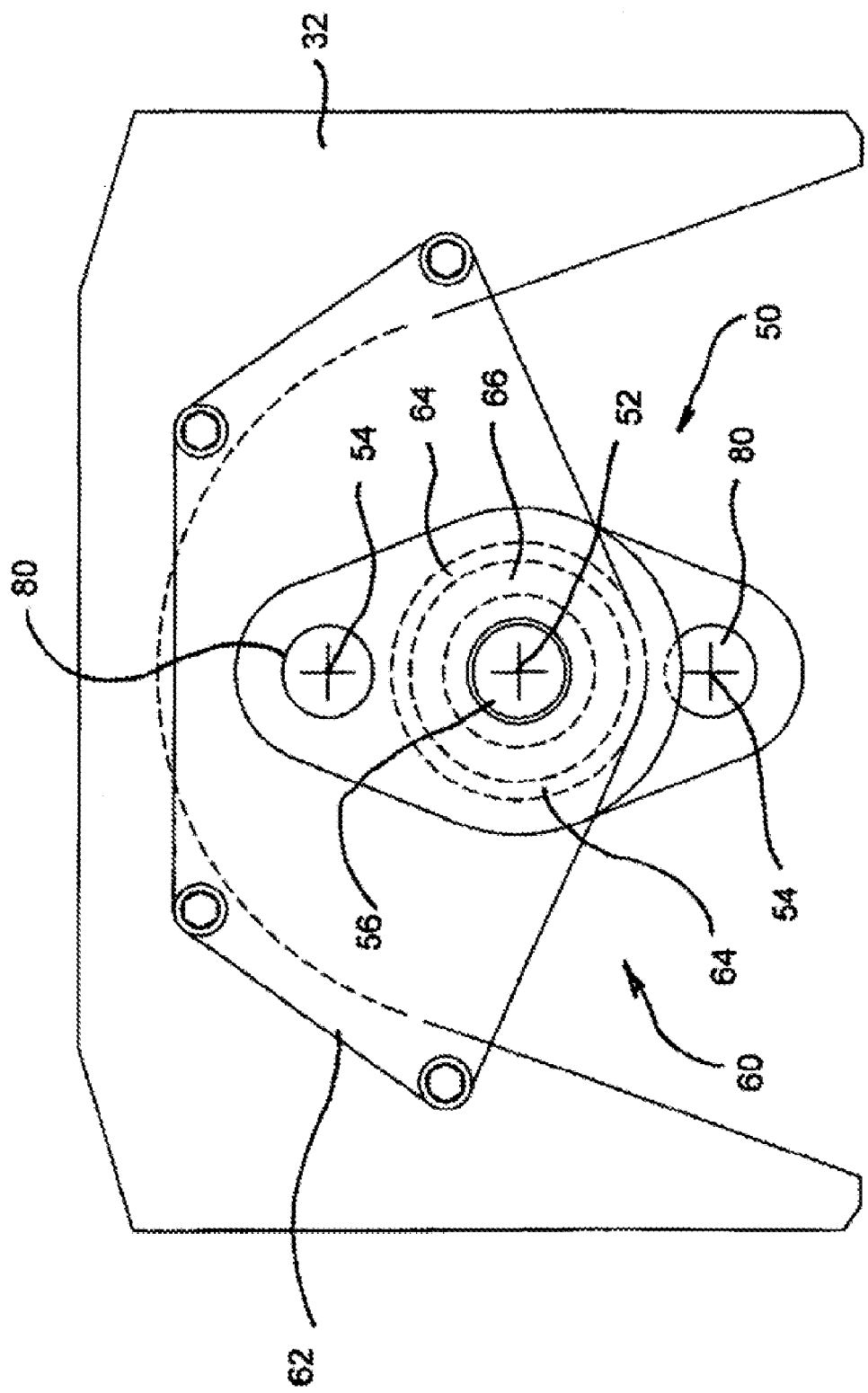
FIG. 4 is an end view of the present invention located within the stuffer assembly.

Many of the fastening, connection, processes and other means and components utilized in this invention are widely known and used in the field of the invention described, and their exact nature or type is not necessary for an understanding and use of the invention by a person skilled in the art, and they will not therefore be discussed in significant detail. Also, any reference herein to the terms "left" or "right," "up" or "down," or "top" or "bottom" are used as a matter of mere convenience, and are determined by standing at the rear of the machine facing in its normal direction of travel. Furthermore, the various components shown or described herein for any specific application of this invention can be varied or altered as anticipated by this invention and the practice of a specific application of any element may already be widely known or used in the art by persons skilled in the art and each will likewise not therefore be discussed in significant detail.

FIG. 1 illustrates a round baler 10 having a frame 12, a hitch 14, a pickup assembly 20, a bale-forming chamber 90 and a pair of supporting wheels 16 enabling the baler to be towed along the ground by a tractor or other similar prime mover. As baler 10 is towed across a field, pick up tines 24 lift crop material, usually in a windrow, from the ground and move the crop material onto a crop feeding transition area 26 at the rearward portion of pickup assembly 20. This feeding is done either directly, such as in a case for crop material aligned with the center of the pickup assembly 20, or indirectly, through the operation of crop transition elements such as auger screws 28 and crop deflecting plate 29. Auger screws 28 converge the material from the full width of the pickup assembly 20 and urge it toward the central portion of the pickup assembly 20, establishing a mat width of crop material matching the desired bale width, typically around four or five feet.

Immediately rearward from the crop feeding transition area 26 is stuffer apparatus 30. The stuffer apparatus 30 engages the crop material moving rearwardly from pickup assembly 20 and feeds it rearwardly into the bale-forming chamber 90. The crop material fed into the chamber 90 is continuously rolled to form a cylindrical package of the crop material. This formation of a cylindrical package takes place in a well-known manner, as generally described above, after which the package is wrapped and discharged through a tailgate (not shown) in the rear portion of the bale-forming chamber 90. Once a bale is discharged, the tailgate is closed and the baler 10 is again ready to form another bale. The bale forming process is described in further detail in U.S. Pat. No. 5,044,272, "Round Baler With Rollers and Belts," incorporated by reference herein in its entirety.

Now turning to FIGS. 2 and 3 where shown is a stuffer apparatus 30 as adapted to the structure of the above described round baler is depicted in further detail. The stuffer apparatus 30 is of the type described in U.S. Pat. No. 5,595,055, "Pickup Apparatus for a Round Baler," in which the present invention is useful and shown in its preferred embodiment. It should be noted that it is not intended that its use be limited to balers of this specific nature, but that the present invention is adaptable for use on most, if not all, current round balers. U.S. Pat. No. 6,651,418, "Modular Pickup, Stuffer, and Rotor" illustrates one such example. These patents are incorporated by reference in their entirety herein.

Stuffer apparatus 30 includes stuffer frame 32, which supports the stuffer apparatus and provides fixtures to connect the stuffer apparatus to the baler frame. Stuffer frame 32 includes two separate end plates 34 connected to stuffer frame 32 on opposing ends of the stuffer apparatus 30 and generally define the transverse width of the stuffer apparatus 30, shown as dimension "A" in FIG. 2. Feed table 40 is also connected to stuffer frame 32 to form a generally planar surface for supporting crop material as it moves across the stuffer apparatus 30. Feed table 40 comprises a plurality of side-by-side members 42 oriented generally parallel to the direction of crop movement, shown as direction arrow "B," and arranged along the transverse width of the feed table 40 to form a plurality of longitudinally oriented slot-like openings 43 generally spanning the transverse width of the stuffer apparatus 30. A plurality of movable feeder fingers 46 extends through the slot-like openings 43 to engage the crop material then present and urge it rearwardly toward the bale-forming chamber 90.

The motion of feeder fingers 46 is caused by rotation of crankshaft 50. Crankshaft 50 is rotatably disposed along central axis of rotation 52 within stuffer apparatus 30 and supported at opposite ends by end plates 34 by bearings or other such suitable rotational support mechanism. Rotational input to crankshaft 50 is directed through a power transmission apparatus (not shown) for baler 10, which is, in turn, typically powered by the PTO of a tractor to which the baler is connected. Rotation of the stuffer crankshaft 50 is coordinated with other well-known actions within the baler, such as crop pickup and bale forming, that those skilled in the art will recognize. As the crankshaft 50 rotates, rotational direction shown as arrow "C," a portion of feeder fingers 46 pass from the below feed table 40, through the forward portion of longitudinal openings 43, to above the plane of feed table 30 where they engage the crop material present. Further rotation of crankshaft 50 moves the feeder fingers 46 rearwardly with a portion thereof remaining above the plane feed table 40 moving the crop material rearwardly as well. As the feeder fingers 46 near the rearward portion of longitudinal openings 43, the reciprocating motion caused by crankshaft 50 causes the portion of feeder fingers previously extended above the plane of feed table 40 to move below the plane of feeder table 40. Continued rotation of crankshaft 50 causes the feeder fingers 46 to return to the forward portion of the longitudinal openings while remaining below the plane of the feed table 40 where they will not engage crop material, and the process begins anew.

Optimal baler performance is achieved when the stuffer apparatus supplies a generally uniform mat of crop material to the bale-forming chamber. To this end, the feeder fingers 46 spanning the transverse width of the stuffer apparatus 30 are uniformly spaced across the transverse width. Finger-to-finger spacing, shown as dimension "D," varies among various baler designs, but in general, closer spacing yields better stuffer performance; a finger-to-finger spacing interval of less than four inches in typical. In the baler in which the present invention is useful, the finger-to-finger spacing interval is two and five-eights inches. Due to the small feeder finger spacing intervals, conventional stuffer crankshafts are typically simply supported (e.g., having only two main crankshaft bearings) at either end as there is little space between the ends where the feeder fingers are located. Relying on crankshaft end-support along becomes problematic as the width of the stuffer assembly increases. Incorporating an additional crankshaft support mid-length typically requires eliminating one or more feeder fingers from the transverse array which negatively affects stuffer performance and, ultimately, bale-forming quality. The present invention, as shown in FIG. 3, incorporates an additional crankshaft support structure 60 that fits within the feeder finger spacing interval.

Referring now to FIGS. 4 and 5, crankshaft support structure 60 is shown in additional detail comprising a support plate 62, containing a bearing housing 64 and bearing 66. Also shown are two crank arm plates 58, 59 which are part of crankshaft 50 and connected to each other by connector shaft 56. Support plate 62 connects to the stuffer frame 32 to provide a structural connection between crankshaft support structure 60 and the crankshaft end bearings located in end plates 34. Bearing housing 64 connects to and penetrates support plate 62 generally perpendicularly to the planar surface of the plate along the central axis of rotation 52 of crankshaft 50. Bearing housing 64 is a tube-like structure configured to receive a conventional bearing 66. In the preferred embodiment, bearing 66 is a spherical, self-aligning bearing to ease crankshaft 50 alignment along central axis of rotation 52 and to avoid unintentional stress load on crankshaft 50 due to mirror misalignment. Other forms of self-aligning bearings are envisioned may be substituted with similar result. The outer diameter of bearing 55 is such that there is a slight interference fit with the inner diameter of bearing housing 64 thereby retaining bearing 55 in place. Connector shaft 56 extends axially through bearing 66 along central axis of rotation 52. Connector shaft 56 is similarly press-fit into the inner race diameter of bearing 66 so that connector shaft 56 is axially secured. Each end of connector shaft 56 extending away from the opposing faces of bearing 66 include a spline 71, 72 for connecting to crank arm plates 58, 59 in a manner that causes the crank arm plates and the connector shaft to rotate in unison. In FIG. 5, it can be observed that the spline connections between the connector shaft 56 and crank arm plates 58, 59 will allow the crank arm plates to move slightly axially along central axis of rotation 52. Proper transverse alignment is maintained by the overall crankshaft mounting within the stuffer mechanism which restrains overall transverse movement along central axis of rotation by bearings located in end plates 34.

FIG. 5 also shows the spatial relation between the stuffer feeder fingers 46 and crankshaft support structure 60. Crankshaft 50 includes at least two crankpins 80 aligned on orbital axes of rotation 54. Orbital axes of rotation 54 rotate about central axis of rotation 52 as crankshaft 50 rotates. The motion of crankpins 80 causes a reciprocating motion in feeder fingers 46. Crankshafts and the numerous types motion that may be caused by them are generally well-known. In the present invention, crankshaft 50 comprises two crankpins 80 arranged opposite, that is, 180 degrees of crankshaft rotation apart. Each crankpin spans approximately one half of the transverse width of the stuffer apparatus so that the crankshaft is generally symmetrical. Other crankshaft configurations, such as those having three, four, or more crankpins, are not precluded by this invention; however, such elaborate crankshafts are not generally employed in common stuffer mechanisms.

Rotatably connected on each crankpin 80 is a feeder finger base 82, extending generally the length of the crankpin 80 and providing an attachment point for an array of feeder fingers 46. Feeder fingers 46 are generally uniformly spaced along the length of base 82, with the spacing interval coinciding with the spacing of longitudinal openings 43 on feeder table 40. Though not shown, a connecting link extending from base 82 to a connection point on stuffer frame 32 prevents base 82 from rotating uncontrollably on crankpin 80 and provides an additional component to the oscillatory motion of the feeder fingers 46, which increases stuffer mechanism effectiveness. Refer to described in U.S. Pat. No. 5,595,055, "Pickup Apparatus for a Round Baler," for additional description of the feeder finger motion as caused by the above described mechanism. The operation of rotating crank stuffer mechanisms is generally well-known and not described in further detail herein.

In order to avoid disrupting the uniform spacing interval of feeder fingers 46, crankshaft support structure 60 is of compact design. The design of support structure 60 is to handle primarily radial crankshaft loads of the type that can lead to excessive crankshaft deflection if left unrestrained. The splined interface between crank arm plates 58, 59 and connector shaft 56 utilizes an involute spline design that allows the portions of crankshaft 50 disposed on either side of crankshaft support structure 60 slight axial displacement, crankshaft support structure 60 provides little resistance to such displacement. Similarly, the use of a self-aligning bearing 66 provides a tolerance for minor alignment imperfections and prevents such imperfections from causing additional stresses in the crankshaft during operation.

It will be understood that changes in the details, materials, steps and arrangements of parts which have been described and illustrated to explain the nature of the invention will occur to and may be made by those skilled in the art upon a reading of this disclosure within the principles and scope of the invention. The foregoing description illustrates the preferred embodiment of the invention; however, concepts, as based upon the description, may be employed in other embodiments without departing from the scope of the inventions.

Having thus described the invention, what is claimed is:

1. A stuffer mechanism for a round baler, said stuffer mechanism comprising:
   a frame assembly connected to said baler, said frame assembly having spaced apart opposing first and second end plates defining a stuffer width therebetween;
   at least two feeder finger assemblies, each having an elongate base with an orbital axis of rotation and a plurality of feeder fingers extending away from said base generally parallel to and uniformly spaced therealong, said axes of rotation of said at least two feeder finger assemblies being generally parallel;
   a crankshaft having spaced apart first and second ends and a central axis of rotation, said first and second ends being rotatably supported and axially restrained, respectively, by said first and second end plates;
   at least two generally parallel and equal length elongate crankpins spaced axially apart and generally end to end between said first and second end plates, each of said at least two crankpins rotatably connected to one of said bases along said orbital axis of rotation; and
   at least one crankshaft support structure supported by said frame assembly, located between said at least two crankpins and respective said at least two feeder finger assemblies, said crankshaft support structure defining a thickness dimension along said central axis of rotation as being no greater than said uniform spacing between adjacent feeder fingers, said at least one crankshaft support structure having a first crank arm plate, a second crank arm plate, a connector shaft connecting said first and second crank arm plates, a bearing rotatably supporting and axially restraining said connector shaft, a bearing housing supporting said bearing, and a support plate connecting said bearing housing to said frame assembly wherein said first and second crank arm plates may move axially relative to said connector shaft during rotation of said crankshaft.

2. The stuffer mechanism of claim 1, wherein said spacing between adjacent feeder fingers is less than four inches.

3. The stuffer mechanism of claim 1, wherein said spacing between adjacent feeder fingers is approximately two and five-eighths (2-5/8) inches.

4. The stuffer mechanism of claim 1, wherein said stuffer width is greater than four feet.

5. The stuffer mechanism of claim 1, wherein said connector shaft and said first and second crankshaft end plates are connected by a torque transferring connection.

6. The stuffer mechanism of claim 5 wherein said torque transferring connection is a splined connection.

7. The stuffer mechanism of claim 6, wherein said splined connection comprises an involute spline.

8. The stuffer mechanism of claim 1, wherein said bearing is self-aligning.

9. In a round baler for traversing a field to form cylindrical bales of crop material, said baler having
   a main frame;
   at least two wheels connected to and supporting said main frame above a surface of the field;
   a bale-forming chamber connected to and supported by said main frame, said chamber having a generally transverse opening for permitting ingress of crop material;
   a pickup apparatus for picking up crop material from said field and feeding rearwardly along a path in the direction of said transverse opening; and
   a stuffer apparatus transversely disposed between said pickup apparatus and said transverse opening, said stuffer apparatus having a frame assembly connected to said round baler an a feeder table structure with a plurality of feeder finger openings; the improvement comprising:
   opposing first and second end plates connected to said frame assembly, spaced apart thereby defining a stuffer width therebetween;
   at least two feeder finger assemblies, each having an elongate base with an orbital axis of rotation and a plurality of feeder fingers extending away from said base generally parallel to and uniformly spaced therealong, said axes of rotation of said at least two feeder finger assemblies being generally parallel;
   a crankshaft having spaced apart first and second ends and a central axis of rotation, said first and second ends being rotatably supported respectively by said first and second end plates;
   at least two generally parallel and equal length elongate crankpins spaced axially apart and generally end to end between said first and second end plates, each of said at least two crankpins rotatably connected to one of said bases along said orbital axis of rotation such that spacing between feeder finger on adjacent said feeder finger assemblies is approximately equal to said uniform spacing; and
   at least one crankshaft support structure supported by said frame assembly, located between said at least two crankpins and respective said at least two feeder finger assemblies, said crankshaft support structure defining a thickness dimension along said central axis of rotations as being no greater than said uniform spacing between adjacent feeder fingers.

10. The improvement of claim 9, wherein said spacing between adjacent feeder fingers is less than four inches.

11. The improvement of claim 9, wherein said spacing between adjacent feeder fingers is approximately two and five-eighths (2-5/8) inches.

12. The improvement of claim 9, wherein said stuffer width is greater than four feet.

13. The improvement of claim 9, wherein said crankshaft support structure further comprises a first crank arm plate, a second crank arm plate, a connector shaft connecting said first and second crank arm plates, a bearing rotatably supporting said connector shaft, a bearing housing supporting said bearing, and a support plate connecting said bearing housing to said frame assembly.

14. The improvement of claim 13, wherein said first and second crank arm plates may move axially relative to said connector shaft.

15. The improvement of claim 14, wherein said connector shaft and said first and second crankshaft end plates are connected by a torque transferring connection.

16. The improvement of claim 15 wherein said torque transferring connection is a splined connection.

17. The improvement of claim 16, wherein said splined connection comprises an involute spline.

18. The improvement of claim 13, wherein said bearing is self-aligning.

* * * * *